Aug. 25, 1959   M. P. CLICQUES   2,901,173
APPARATUS FOR MEASURING THE PRODUCT OF TWO
CONCURRENTLY VARYING QUANTITIES
Filed Oct. 17, 1956   7 Sheets-Sheet 1

INVENTOR
Marcel Paul Clicques
BY
ATTORNEYS

United States Patent Office 2,901,173
Patented Aug. 25, 1959

2,901,173

APPARATUS FOR MEASURING THE PRODUCT OF TWO CONCURRENTLY VARYING QUANTITIES

Marcel Paul Clicques, Paris, France, assignor to Etablissements Labinal, Paris, France, a society of France Application October 17, 1956, Serial No. 616,438

Claims priority, application France October 20, 1955

8 Claims. (Cl. 235—194)

The present invention relates to apparatus for measuring the product of two concurrently varying quantities. My invention is more especially, but not exclusively, concerned with fluid metering apparatus giving the rate of flow of a fluid, measured in terms of mass and not of volume, and which will hereinafter be called "mass flow meters." It is obvious that when the density of the fluid is variable during the measurement operation (for instance under the effect of variations of a physical factor such as the temperature), the significant indication to be obtained is not the volume flow rate but this flow rate multiplied by the concurrently existing value of the density of the fluid, the product thus obtained being the mass flow rate.

The object of my invention is to provide an apparatus of this kind which is well adapted to meet the requirements of practice.

For this purpose, according to my invention, means are provided for transmitting through an electric circuit a succession of pulses at a repetition frequency constantly proportional to the value of one quantity $x$ which is for instance the volume flow rate of the fluid, this circuit being arranged to control the rotational speed of a first rotating member so as to make it proportional to said repetition frequency, said first rotating member being coupled with the second rotating member through a variable ratio transmission gear responsive to variations of the other quantity $y$, which is for instance the density of the fluid, so as to keep the ratio of the rotational speed of the second member to that of the first member proportional to the value of said last mentioned quantity $y$, the rotational speed, or the number of revolutions during a given time period, of the second rotating member supplying the desired measurements.

Other features of my invention will become apparent in the course of the following detailed description of some embodiments thereof, with reference to the accompanying drawings, given merely by way of example and in which.

In the following description it will be supposed that my invention is applied to the construction of a mass flow meter for measuring the mass flow rate of a liquid the density of which varies during the measurement, as it is the case for the measurement of the fuel absorbed by the engines of an aircraft, and in particular of a jet aircraft.

The principle of such an apparatus will be set forth with reference to Fig. 1.

The liquid the mass flow rate of which is to be measured flows through a conduit 10. In this conduit is mounted a rotor 1 driven by this liquid so that the rotational speed $\omega_1$ of this rotor is proportional to the fluid volume flow rate $x$.

$$\omega_1 = k_1 x$$

This rotor 1 controls, through means which will be more explicitly explained hereinafter, a pulse transmitter 2 so that $N_1$ pulses $I_1$ are transmitted for every revolution of rotor 1. Therefore the frequency of repetition of pulses $I_1$ is equal to $$\frac{\omega_1}{2\pi} \cdot N_1$$

A rotating member 4 is caused to rotate at a speed proportional to that of rotor 1.

For this purpose, said member 4 is driven by an electric motor M (through a transmission gear 3 which will be more explicitly referred to hereinafter) and said member 4 is made to control (through parts, such as 11 more specifically referred to hereinafter) a pulse transmitter 5 so that the frequency of repetition of the pulses $I_2$ from said transmitter 5 is proportional to the rotational speed $\omega$ of said member 4. Thus if $N_2$ pulses are transmitted for every revolution of member 4, the frequency of repetition of pulses $I_2$ is $$\frac{\omega}{2\pi} \cdot N_2$$

Both of the trains of pulses $I_1$ and $I_2$ are sent, through circuits $A_1$ and $A_2$, to the input of a comparator 6 capable of supplying at its output a voltage variable in accordance with the phase difference between said trains of pulses and with the relative values of their respective repetition frequencies. This output voltage is transmitted through a circuit $A_M$ to a control winding of motor M (such a control winding being shown, without reference numeral, on Fig. 7) in such manner as automatically to regulate the speed of said motor so that the frequency of repetition of pulses $I_2$ is kept equal to that of pulses $I_1$. Therefore $$\frac{\omega_1}{2\pi} \cdot N_1 = \frac{\omega}{2\pi} N_2 \text{ and } \omega = \frac{N_1}{N_2} \cdot \omega_1$$

Now, the variable ratio transmission gear 3 between motor M (the shaft of which has a rotational speed $\omega_2$) and part 4 (the rotational speed of which is $\omega$) is controlled, through a device 8 which will be fully described hereinafter, in such manner that the ratio $$\frac{\omega_2}{\omega}$$

of said speeds is constantly made proportional to the density $y$ of the liquid the mass flow rate of which is to be measured $$\frac{\omega_2}{\omega}=k_2 y$$

Therefore $$\omega_2=k_2\omega y=k_2\frac{N_1}{N_2}\omega_1 y$$

and, since $\omega_1=k_1 x$, $$\omega_2=k_1 k_2\frac{N_1}{N_2}x\cdot y$$

Since $k_1$, $k_2$, $N_1$ and $N_2$ are all constant factors, $$k_1 k_2\frac{N_1}{N_2}$$

can be replaced by a single constant factor $K$ and $\omega_2=Kxy$.

The rotational speed $\omega_2$ of motor M, measured by means of tachometer 7, gives the instantaneous value of the mass flow rate of the liquid.

A counter 9, mounted on the shaft of motor M so as to indicate the number of revolutions of said shaft during a given time period, will make it possible to know the total mass flow rate of liquid during this period.

I will now specifically describe the various devices which have been above mentioned.

Concerning first the pulse transmitters such as 2 and 5, they may be of any suitable known type. For instance they may include a magnetized mass carried by the rotor and passing in front of a solenoid. But such an arrangement gives rise to a substantial interaction between the magnet and the core of the solenoid, so that the speed of rotation of the rotating member (rotor 1 or disc 4) is more or less perturbed.

It seems preferable, according to my invention, to make use of the deflection of an electron beam in a vacuum tube, under the effect of a magnet (such a magnet being designated by reference numeral 11 on Figs. 1 and 7) carried by the rotating member. The kind of tube which is most suitable for this purpose seems to be a vacuum photoelectric cell 12 (Fig. 7) subjected to a constant illumination at 13. The current variation that is obtained may be as high as one microampere under the effect of a magnet of a weight of some grams passing at 1 cm. from the cell, said magnet being made of the substance designated by the trademark "Ticonal."

The pulses that are thus obtained are of greater amplitude than with a system including a magnet and a solenoid and these pulses are independent of the rotational speed. The feed voltage of the cell is not critical. A value of 24 volts seems to be sufficient. With a load resistor averaging 1 megohm inserted in the circuit, it is possible to obtain pulses of 1 volt.

I will now deal with the variable ratio transmission gear to be incorporated in my apparatus. I may use devices including cooperating cones and discs. However it seems more advantageous to make use of a system including a ball cooperating with a flat disc and at least one cylinder.

Figure 1:
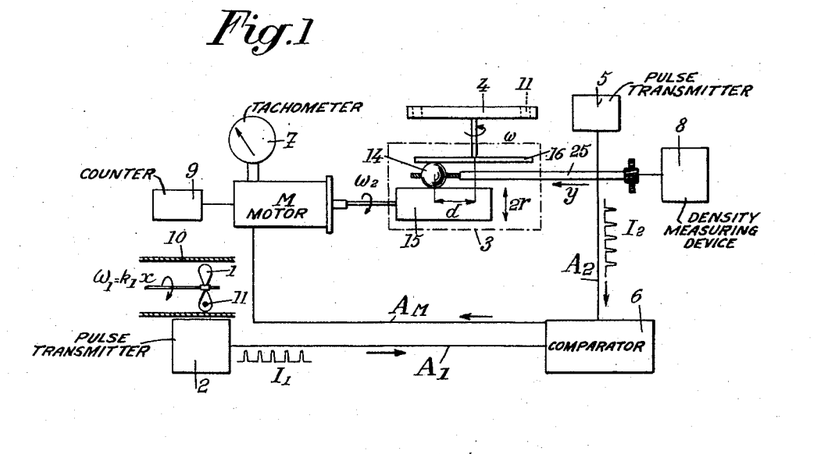
Fig. 1 diagrammatically shows an apparatus made according to my invention.

Such a system is shown on Fig. 1. It includes a ball 14 interposed between a cylinder 15 fixed on the shaft of motor M and a disc 16 carrying member 4. It will be seen that if $r$ is the radius of cylinder 15 and $d$ the distance between the axis of disc 16 and the point of contact of ball 14 ($d$ being varied in accordance with the variations of the density $y$), the ratio between the rotational speeds $\omega_2$ and $\omega$ is $$\frac{d}{r}$$

Figures 2, 3:
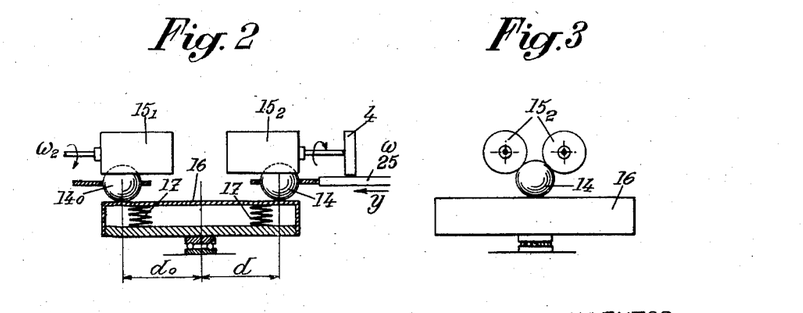
Figs. 2 and 3 separately show, respectively in elevational view and in side view, a variable ratio transmission gear for use in an apparatus according to my invention.
Figure 7:
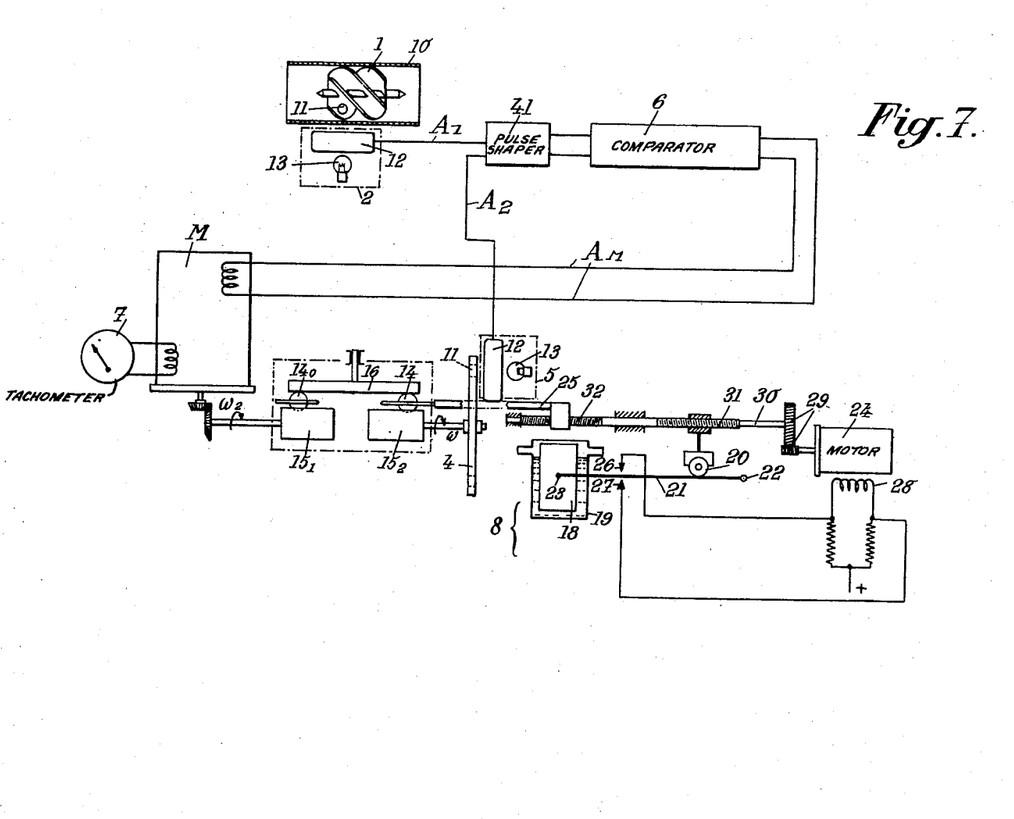
Fig. 7 is a diagrammatic elevational view showing with more details an apparatus for measuring the mass flow rate of a liquid, according to my invention.

An analogous arrangement is shown on Figs. 2, 3 and 7. In this case there are two balls 14, $14_0$ and at least two cylinders $15_1$, $15_2$. One of the cylinders $15_1$ rotates at a speed $\omega_2$ and the other cylinder $15_2$ at speed $\omega$. The distances between the points of contact of balls 14 and $14_0$ and the axis of disc 16 are respectively $d$ and $d_0$. The ratio between the speeds $\omega_2$ and $\omega$ is, in this case, equal to $$\frac{d}{d_0}$$

With this last mentioned construction, it is possible to make use of one of the balls, to wit 14, to vary distance $d$ in accordance with the value of the density and to make use of the other ball $14_0$ for a manual adjustment (for instance through means as hereinafter described with reference to Fig. 11).

Advantageously springs 17 are provided to apply disc 16 against balls 14 and $14_0$. Furthermore, in order to have a stable position of the balls, there are two cylinders $15_1$ and two cylinders $15_2$.

Figure 4:
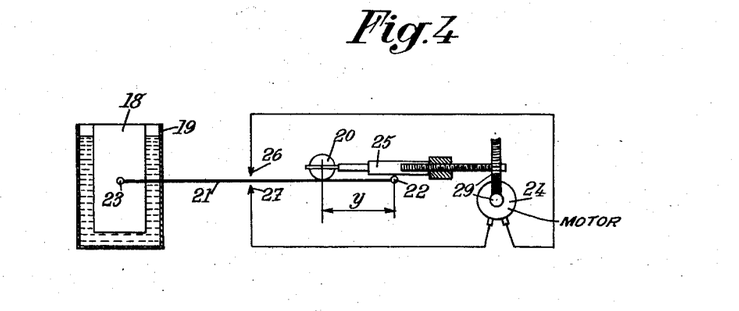
Fig. 4 diagrammatically illustrates, in elevational view with parts in section, the principle of operation of a device for measuring the density of a liquid.

Concerning now the device 8 intended to measure the density $y$ of the liquid and to vary, in the variable ratio transmission gear 3, the distance $d$ proportionally to said density $y$ by a displacement of ball 14, it is advantageous to make it as illustrated by Figs. 4 and 7 (this device being not responsive to variations of the gravity acceleration $g$, which are relatively important on an aircraft).

In this device, a float 18 is immersed in the liquid, itself contained in a tank 19, and this float is mounted, with a suitable pivotal connection, at the end of a rod or lever 21 pivoted at its other end about a fixed axis 22. A counterweight 20 is slidable along rod 21. It will be readily understood that if, through suitable means, counterweight 20 is made to slide along rod 21 in such manner as to maintain said rod practically in the same position, despite variations of the density of the liquid, the distance from counterweight 20 to fixed axis 22 indicates the value of said density $y$, and this indication is not influenced by variations of the gravity acceleration $g$.

The means for constantly keeping rod 21 in the same position include for instance an electric motor 24 controlling, through gears 29, the rotation of the threaded rod engaged in internal screw-threads carried by a rod 25 which carries counterweight 20 (said counterweight consisting of a ball resting upon rod 29). When rod 29, due to a variation of the density of the liquid, tends to swing upwardly or downwardly, it comes into contact with contact fingers 26 and 27 inserted in the control circuit of motor 24 so as to operate said motor in one direction or the other until rod 21 has been returned to its initial position.

Fig. 7 shows an apparatus according to my invention in a more detailed fashion.

In particular, concerning the means for measuring the density, the winding of motor 24 is visible at 28. The shaft of said motor 24 controls, through gears 29, an intermediate shaft 30 provided with right and left threads 31 and 32. Threads 31 serve to move counterweight 20 along rod 21, whereas threads 32 control the displacement of the rod 25 which carries ball 14.

Such an arrangement is very stable provided that the speed reduction at 29 is sufficient and that the movements of the float 18 are sufficiently damped by a viscosity braking, which can easily be obtained by providing a sufficiently small clearance between float 18 and the wall of tank 19.

The pivoting connection 23 between rod 21 and float 18 is preferably ensured across the wall of tank 19 by a magnetic effect, as it will be hereinafter described with reference to Figs. 9 and 11.

Figure 5:
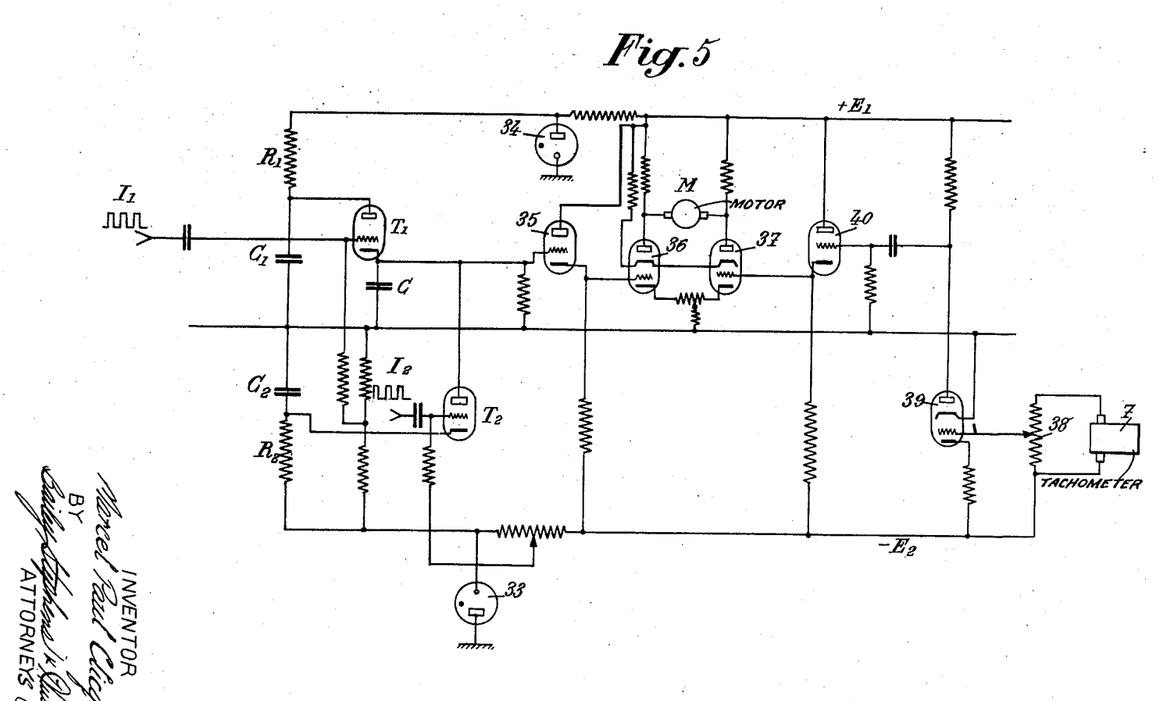
Fig. 5 shows an electric comparator for use in an apparatus such as illustrated by Fig. 1.

I will now describe comparator 6. Advantageously, according to my invention, this comparator device must be capable of supplying an output signal in response both to a phase difference between the trains of pulses $I_1$ and $I_2$ when said trains are of the same frequency and to a difference between the respective frequencies of said trains $I_1$ and $I_2$.

In this way, the two trains of pulses always remain connected to one another.

For this purpose, it is advantageous to make use of a capacitor which is combined with two devices, and in particular thyratrons, influenced by the two trains of impulses respectively, in such manner that reception of one pulse of one train has for its effect to increase the charge of the capacitor, whereas reception of one pulse of the other train has for its effect to reduce it. Furthermore, if two pulses of the same train are received successively, that is to say without one pulse of the other train being received between them, they produce two successive charges of the capacitor and thus cause the output voltage supplied by comparator 6 to motor M to be increased.

Figure 6:
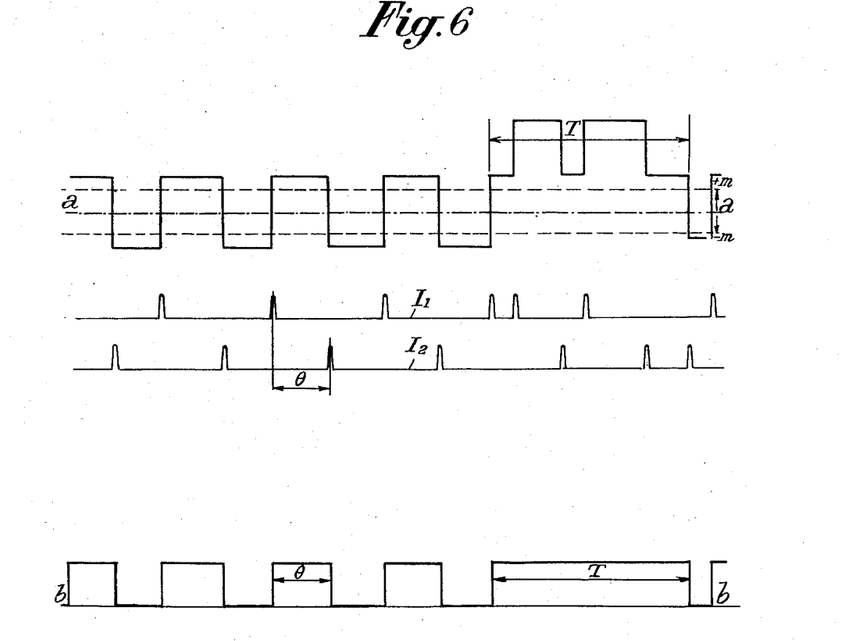
Fig. 6 consists of a plurality of curves illustrating the operation of the comparator of Fig. 1.

Fig. 6 shows at $a$ the square voltage waveform corresponding to the charge variations of such a capacitor, in response to the reception of pulses of the two trains $I_1$ and $I_2$.

When the system is working under stable conditions, the signals are as shown on the left hand side of Fig. 6, both of the trains having the same frequency and the phase difference $\theta$ between them being that which corresponds to these conditions. The right hand side of Fig. 6 shows what takes place when two successive pulses of the same train are received before the capacitor is discharged in response to a pulse received from the other train.

These signals are received in a rectifier system which clips them above $+m$ and below $-m$ so that the signal finally obtained is that shown on Fig. 6 at $b$. The output voltage supplied by comparator 6 is the mean value of the square waveform voltage so that, at least in the stable conditions shown on the left hand side of the drawing, it is proportional to the phase difference $\theta$. When the rotational speed $\omega_1$ increases, the relative phase difference between the two trains of pulses increases, so that the output voltage supplied to motor M increases and the rotational speed $\omega_2$ of this motor also increases. Of course, when quantity $y$ increases it is also necessary to obtain an increase of the rotational speed of motor M and this is produced by the increase of the relative phase difference between the two trains of pulses.

If now, for some accidental cause, the two frequencies become different (right hand side of Fig. 6), for a corresponding time period T the output voltage is given its maximum value, which restores stable conditions of operation, generally with other values of the frequencies and of the phase difference between the two trains of pulses.

Fig. 5 illustrates a thyratron arrangement which complies with the above stated conditions.

On this figure, the above mentioned capacitor is shown at C. It is combined with two other capacitors $C_1$ and $C_2$, one positively charged by voltage $+E_1$, the other negatively charged by voltage $-E_2$ ($E_1$ being possibly equal to $E_2$), the connections between these capacitors being controlled by two thyratrons $T_1$ and $T_2$ which are normally biased to cut-off by a negative grid.

In the arrangement shown by the drawing, the cathode of one thyratron is connected with the anode of the other and capacitor C is inserted in middle position in the connection between the two thyratrons and the earth.

The two other capacitors $C_1$, $C_2$ are inserted between the earth and the external electrodes of the two thyratrons.

By applying the two trains of pulses to the respective grids of these two thyratrons, the desired operation is obtained.

A pulse received by thyratron $T_1$ fires said tube, which causes capacitor $C_1$ (initially charged to $E_1$) to discharge into capacitor C which becomes charged. But when a pulse is subsequently received by thyratron $T_2$, said capacitor C discharges into capacitor $C_2$ which is charged negatively. Finally, if two successive pulses of the same train are received without a pulse of the other train being interposed between them, there are two successive chargings of capacitor C.

Load resistors $R_1$, $R_2$ are provided as shown. I also advantageously provide neon tubes 33, 34 to stabilize voltages $E_1$, $E_2$ (which will be for instance $+150$ and $-150$ volts).

In order to pass from the waveform shown at $a$ on Fig. 6 to that shown at $b$ on the same figure, the voltages coming from capacitor C are first applied to a power stage such as a cathode follower tube 35, then the signals thus obtained are passed to a device for clipping them above and below levels $+m$ and $-m$ respectively. This device includes at least one electronic tube biased in such manner that it is saturated for voltages above $+m$ and there is no current for those below $-m$.

As a matter of fact it is advisable to make use, as shown by Fig. 5, of two tubes 36, 37 of this kind, one receiving the above mentioned signals and the other receiving a stabilizing voltage which depends upon the actual value of the rotational speed of motor M. This motor is mounted between the respective anodes of the two tubes 36, 37 and it receives the output voltage from tube 36.

The stabilizing voltage will be for instance collected, by means of a suitable potentiometer 38 and after amplification at 39, 40, on the tachometric voltage supplied by the tachometric device 7.

This tachometric device 7 may be constituted by a mere winding providing on motor M and across the terminals of which there is obtained a voltage proportional to the rotational speed of said motor. It may also be constituted by a tachometric generator driven by motor M.

Before the input of comparator device 6 (Figs. 1 and 7) there is to provide a pulse-shaper, for instance of the Schmitt type, to give the desired square waveform to the pulses generated at 2 and 5, such a device being diagrammatically shown at 41 on Fig. 7.

I will now describe another embodiment of my invention, which is simpler since motor M is dispensed with.

Figure 8:
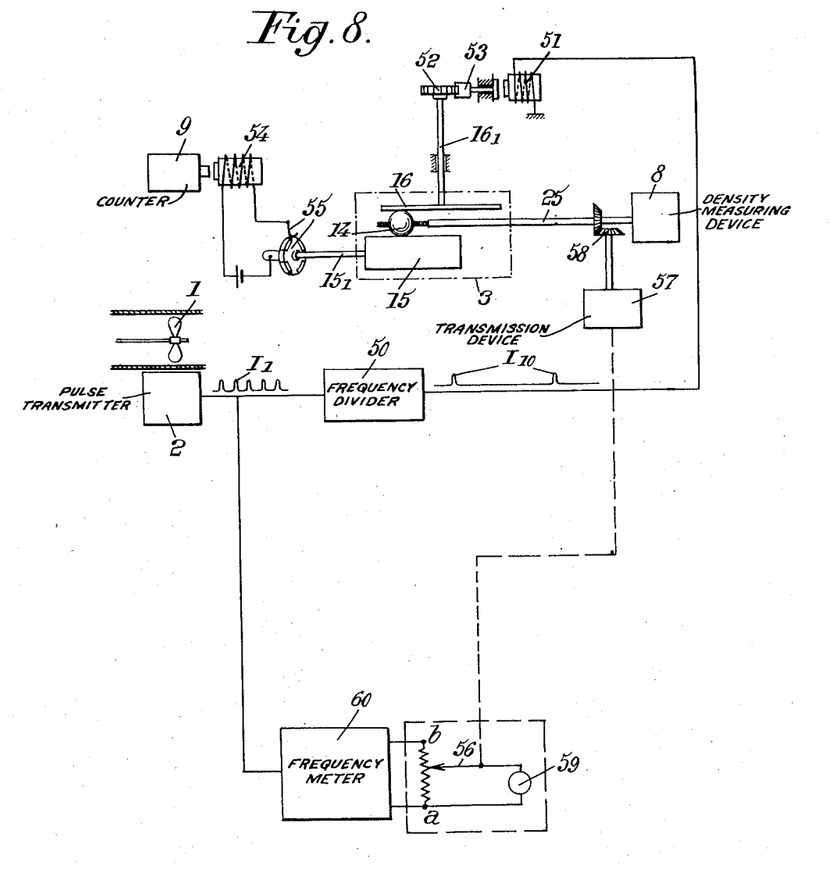
Fig. 8 is a diagrammatical view similar to Fig. 1 but relating to another embodiment of the invention.

According to this embodiment, diagrammatically illustrated by Fig. 8, a train of pulses $I_1$ is generated as in the case of Fig. 1, but said pulses serve to drive, for instance step by step, the shaft $16_1$ of the variable ratio transmission gear 3, said shaft being in this case an input shaft.

The product $x \, y$ is then obtained, as above, on the output shaft $15_1$ of said transmission gear, and this last mentioned shaft can actuate a counter 9 which, as in the case of Fig. 1, will give the total value of said product $x \, y$ for a period of time starting from the beginning of the operation that is considered.

Generally it is preferable to reduce the rate of repetition of the pulses, both at the input of the transmission gear and at the input of the counter.

For instance, there is inserted at 50 a frequency divider of any suitable type which, receiving pulses $I_1$ at a given frequency (for instance 16 pulses per liter of liquid), supplies at its output, at $I_{10}$, pulses at a different frequency of repetition (for instance 1 pulse for every 2 liters).

These pulses $I_{10}$ control shaft $16_1$ through any suitable means, for instance an electro-magnet 51 actuating a ratchet wheel 52 by means of a pawl 53. In a system such as above referred to, if the number of teeth of wheel 52 is 60, a full revolution of shaft $16_1$ or of plate 16 will correspond to 120 liters.

Finally shaft $15_1$ operates counter 9 through an electro-magnet 54 controlled by pulses supplied by a contactor device 55.

This counter gives the total value of the mass flow rate but does not give the instantaneous value of this flow rate.

In order to obtain this instantaneous value, I may proceed as follows.

The instantaneous volume flow rate ($x$) is obtained in the form of a voltage delivered across terminals $a$ $b$ at the output of a frequency meter 60 which receives signals $I_1$. This voltage is applied to a potentiometer the resistor of which extends between terminals $a$ and $b$ and the slider of which is shown at 56. This slider 56 is movable in response to variations of density $y$. For instance it is actuated through a transmission device 57 driven at 58 by the device 8 which is operative in response to variations of density $y$. The voltage V indicated by a voltmeter 59 indicates the instantaneous value of the mass flow rate $x$ $y$.

Figure 9:
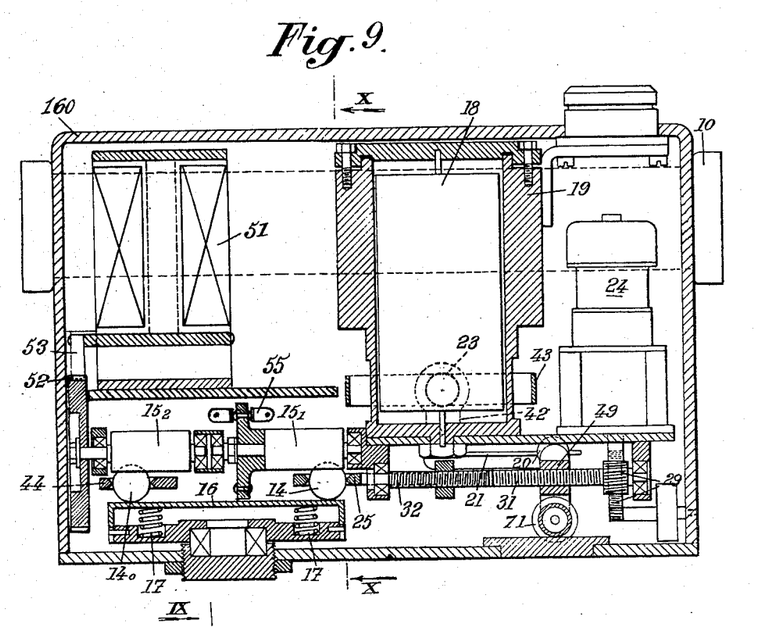
Figs. 9 to 11 are, respectively, a sectional view on the line IX—IX of Fig. 10, a sectional view on the line X—X of Fig. 9 and a sectional view on the line XI—XI of Fig. 10, of an apparatus corresponding to the embodiment diagrammatically illustrated by Fig. 8.
Figure 10:
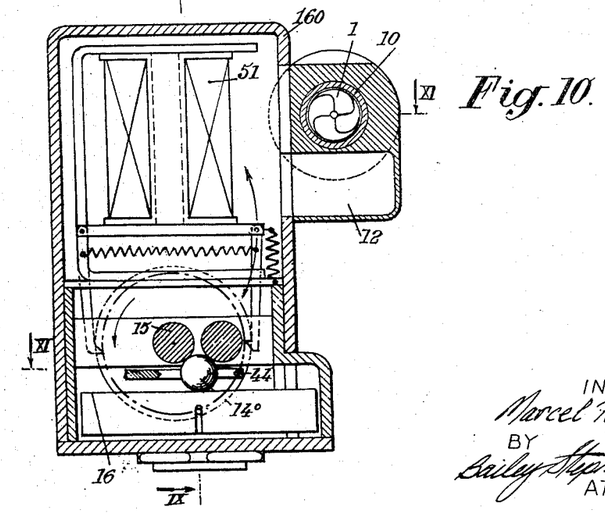
Figure 11:
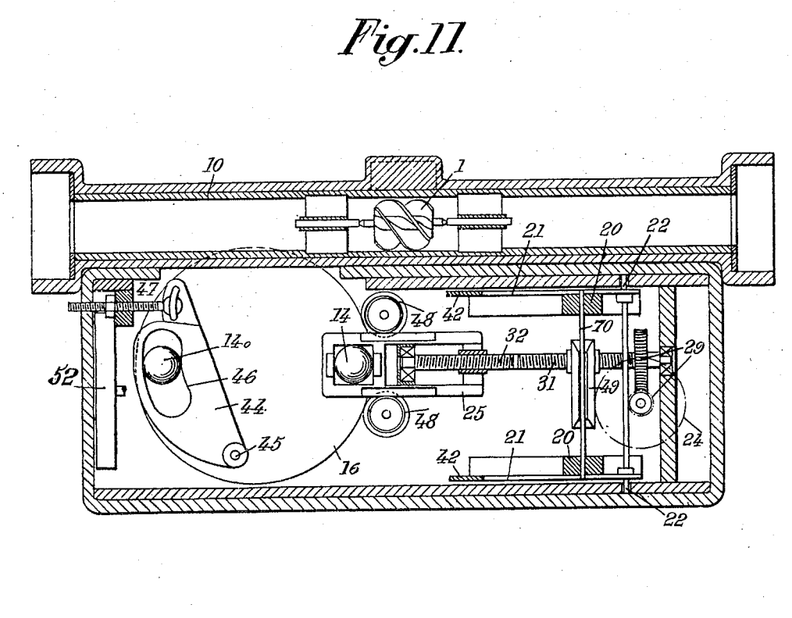

Figs. 9 to 11 illustrate in a more detailed fashion a construction of an apparatus made on the principle illustrated by Fig. 8. In this construction, the variable ratio transmission gear includes two balls 14, $14_0$, as indicated on Fig. 2.

The devices illustrated on Fig. 8 are placed in a casing 160 and are designated by the same reference numerals as in said Fig. 8.

The plane view of Fig. 11 shows that there are two counterweights 20 running along two rods 21, pivoted at 22. The displacement of said counterweights is controlled at 49, 70 from the threaded rod 31. A guiding roller is provided at 71. These rods 21 form a frame which extends upwardly at 42 so as to be integral with a belt 43 surrounding tank 19 and which carries the magnetized masses 23 which act upon float 18 through the wall of the tank, so as to constitute the connection with said float.

Motor 24 is vertical.

The electro-magnet controlled by pulses $I_{10}$ is visible at 51 but in this case, since the variable ratio transmission gear includes two balls 14, $14_0$ and two rollers $15_1$, $15_2$ (as in Fig. 2), this electro-magnet actuates one of the rollers, to wit $15_2$, whereas the other roller $15_1$ carries contactor 55.

44 is a plate pivotally mounted at 45 and provided with a housing 46 for the ball $14_0$. The displacement of said plate with respect to a screw system 47 permits of adjusting the position of this ball.

25 is a kind of frame movable by screw 32 and which positions ball 14 in accordance with the value $y$, this frame 25 being guided laterally at 48, 48.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. Apparatus for measuring the product of two concurrently varying quantities $x$ and $y$ which comprises, in combination, an electric circuit, means responsive to variations of quantity $x$ for transmitting through said circuit a succession of pulses at a frequency proportional at any time to the value of said quantity $x$ at this time, a rotating part, means connected with said circuit for controlling the rotational speed of said part to make it proportional to said frequency, another rotating part, a variable ratio transmission gear between said two parts, means responsive to variations of quantity $y$ for controlling said transmission gear to keep at any time the ratio of the speed of the second part to that of the speed of the first part equal to the value of said quantity $y$ at said time, and means for indicating the number of revolutions of said second part from a given time origin.

2. An apparatus according to claim 1 in which said means connected with said circuit for controlling the rotational speed of the first mentioned rotating part to make it proportional to said frequency include an electric motor the driving shaft of which constitutes said second mentioned rotating part, a second electric circuit, means operative by said first mentioned rotating part for transmitting through said second electric circuit a succession of pulses at a frequency proportional to the rotational speed of said first mentioned rotating part, an electric comparator having its input connected to both of said circuits, the output of said comparator being connected with one winding of said motor to control the speed thereof so as constantly to tend to make the respective frequencies of said two successions of pulses equal to each other.

3. An apparatus according to claim 1 in which said variable ratio transmission gear includes at least one cylinder coupled with said second rotating part, a rotating disc coupled with said first rotating part, the axis of said disc being perpendicular to the axis of said cylinder, a ball interposed between said cylinder and said disc, and means for moving said ball in a direction parallel to the axis of said cylinder.

4. An apparatus according to claim 1 in which said variable ratio transmission gear includes two cylinders in line with each other and coupled with said rotating parts respectively, a freely rotating disc having its axis perpendicular to the common axis of said cylinders, two balls interposed between said disc and said respective cylinders, both of said balls being movable in a direction parallel to the axis of said cylinders, whereby one of said balls can be moved to vary the gear ratio in response to variations of said quantity $y$ whereas the other ball can be moved manually for a supplementary adjustment.

5. Apparatus for measuring the product of two concurrently varying quantities $x$ and $y$ which comprises, in combination, an electric circuit, means responsive to variations of quantity $x$ for transmitting through said circuit a succession of pulses at a frequency proportional at any time to the value of said quantity $x$ at this time, a rotating part, electro-mechanical means connected with said circuit for transmitting a step by step rotation to said part in response to said pulses, another rotating part, a variable ratio transmission gear between said two parts, means responsive to variations of quantity $y$ for controlling said transmission gear to keep at any time the ratio of the speed of the second part to that of the speed of the first part equal to the value of said quantity $y$ at said time, and a counter operatively connected with said second part for indicating the number of revolutions thereof from a given time origin.

6. An apparatus according to claim 5 further including means operatively connected with said electric circuit and with said $y$ variation responsive means for indicating the instantaneous value of product $x$ $y$.

7. An apparatus according to claim 5 further including a frequency meter connected with said electric circuit to indicate the frequency of repetition of said pulses, a potentiometer including a resistor inserted across the output terminals of said frequency meter and a contact slidable along said resistor, means operative by said $y$ variation responsive means for moving said contact along said resistor in response to variations of quantity $y$, and a voltmeter inserted between said slidable member and one end of said resistor, whereby said voltmeter gives an indication proportional to the instantaneous value of product $x$ $y$.

8. Apparatus for measuring the product of two concurrently varying quantities $x$ and $y$ which comprises, in combination, an electric circuit, means responsive to variations of quantity $x$ for transmitting through said circuit a succession of pulses at a frequency proportional at any time to the value of said quantity $x$ at this time, a rotating part, electro-mechanical means connected with said circuit for transmitting a step by step rotation to said part in response to said pulses, another rotating part, a variable ratio transmission gear between said two parts, means responsive to variations of quantity y for controlling said transmission gear to keep at any time the ratio of the speed of the second part to that of the speed of the first part equal to the value of said quantity y at said time, a revolution counter, a mechanism operatively connected with said counter for drivng it step by step, a circuit including a source of current, an electro-magnet for operating said mechanism inserted in said last mentioned circuit, and a contactor in said circuit operatively connected with said second mentioned rotating part.

References Cited in the file of this patent

UNITED STATES PATENTS

| | | |
|---|---|---|
| 2,031,852 | Poillot | Feb. 25, 1936 |
| 2,221,943 | Fischer | Nov. 19, 1940 |
| 2,362,661 | Peters et al. | Nov. 14, 1944 |
| 2,671,608 | Hirsch | Mar. 9, 1954 |
| 2,671,610 | Sweer | Mar. 9, 1954 |
| 2,727,392 | Hazard et al. | Dec. 20, 1955 |
| 2,819,437 | White | Jan. 7, 1958 |